(12) United States Patent
Tholen

(10) Patent No.: US 7,695,606 B2
(45) Date of Patent: Apr. 13, 2010

(54) ELECTROLYTIC DEVICE AND METHOD FOR DISINFECTING WATER IN A WATER SUPPLY SYSTEM BY MEANS OF THE GENERATION OF ACTIVE CHLORINE

(76) Inventor: Johannes Petrus Paulus Tholen, Graaf Wichmanlaan 19, 1405 GX Bussum (NL)

( * ) Notice: Subject to any disclaimer, the term of this patent is extended or adjusted under 35 U.S.C. 154(b) by 1097 days.

(21) Appl. No.: 10/500,645

(22) PCT Filed: Dec. 31, 2002

(86) PCT No.: PCT/NL02/00873

§ 371 (c)(1),
(2), (4) Date: Apr. 5, 2005

(87) PCT Pub. No.: WO03/055806

PCT Pub. Date: Jul. 10, 2003

(65) Prior Publication Data

US 2005/0173261 A1 Aug. 11, 2005

(30) Foreign Application Priority Data

Jan. 4, 2002 (NL) .................................... 1019698

(51) Int. Cl.
*C02F 1/467* (2006.01)
*C02F 1/461* (2006.01)

(52) U.S. Cl. ........................ 205/701; 205/742; 205/743; 204/242; 204/275.1

(58) Field of Classification Search ................. 205/701, 205/742, 743; 204/242, 275.1
See application file for complete search history.

(56) References Cited

U.S. PATENT DOCUMENTS

| 4,129,493 | A | 12/1978 | Tighe et al. |
| 5,228,964 | A | 7/1993 | Middleby |
| 6,200,434 | B1 | 3/2001 | Tsuchiya et al. |
| 6,627,053 | B2 * | 9/2003 | Hirota et al. ............. 204/228.1 |

FOREIGN PATENT DOCUMENTS

| EP | 0 155 479 | 9/1985 |
| EP | 1 074 515 | 2/2001 |
| GB | 1 426 017 | 2/1976 |
| JP | 407068264 A | * 3/1995 |
| WO | WO 01 17908 | 3/2001 |

* cited by examiner

*Primary Examiner*—Arun S Phasge
(74) *Attorney, Agent, or Firm*—Young & Thompson

(57) ABSTRACT

The present invention relates to an electrolytic device for disinfecting water in a water supply system using active chlorine, comprising an electrolytic cell having electrodes and a generator driven by the water, a part of the water being guided through the electrolytic cell and at least a part of the feeding of the electrolytic cell being guided through a salt dosing device containing a compound capable of supplying chloride ions to the water.

15 Claims, 1 Drawing Sheet

Figure 1:
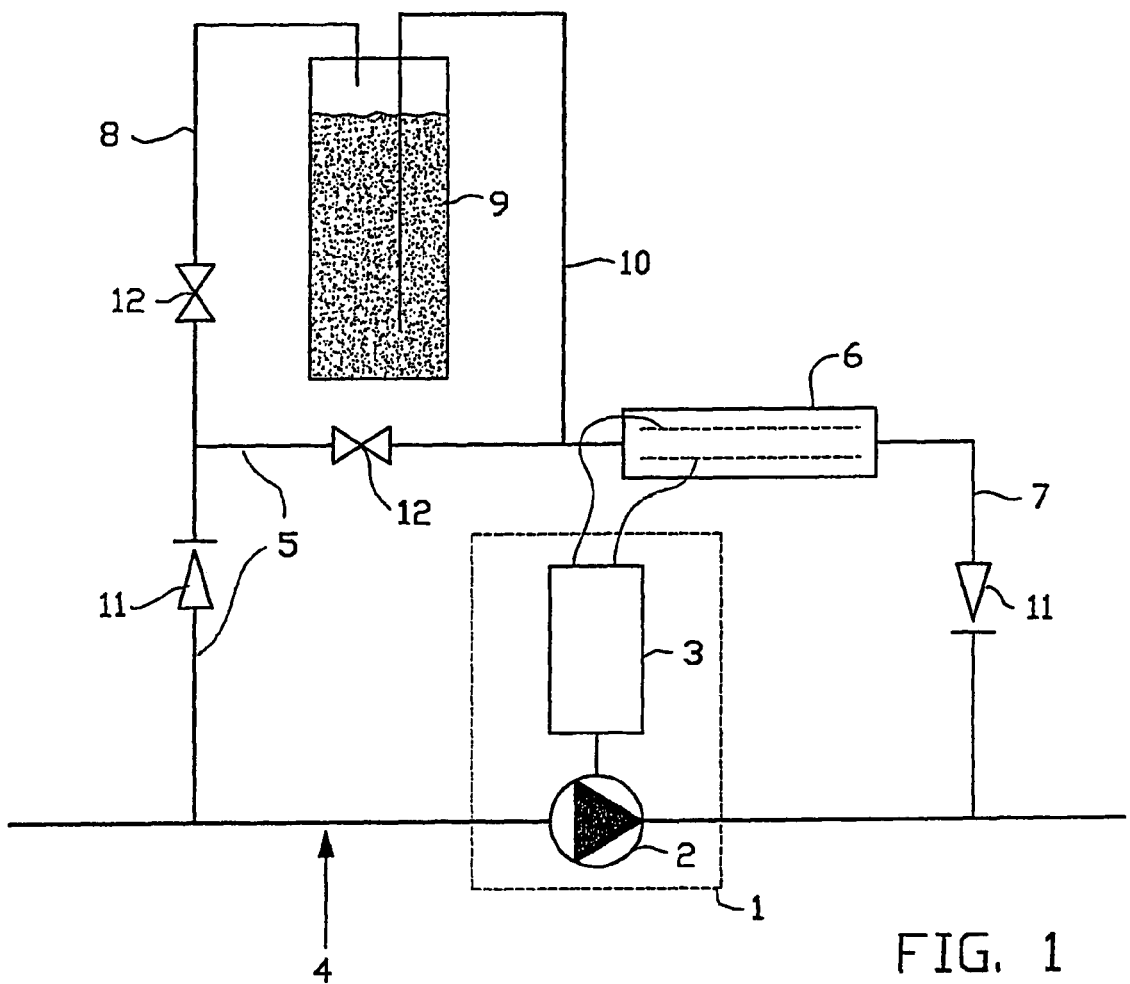

ELECTROLYTIC DEVICE AND METHOD FOR DISINFECTING WATER IN A WATER SUPPLY SYSTEM BY MEANS OF THE GENERATION OF ACTIVE CHLORINE

BACKGROUND OF THE INVENTION

1. Field of the Invention

The present invention relates to an electrolytic device for disinfecting water in a water supply system, by means of the generation of active chlorine, comprising an electrolytic cell which is provided with electrodes over which a voltage difference is applied and a generator for supplying the voltage difference for the electrolytic cell, which generator is driven by the water in the water supply system.

The invention further relates to a method for disinfecting water in a water supply system by electrolysis.

2. Description of the Related Art

The use of electrolysis for disinfecting water is known. Usually sodium chloride (NaCl) is electrochemically converted into chlorine and caustic (as a by-product). The salt dissolves in water under forming of $Na^+$- and $Cl^-$-ions. When said solution is guided through an electrolytic cell, while a voltage is applied over the electrodes of said cell, chlorine ($Cl_2$), oxygen and hydrogen ions are formed at the anode and hydrogen and hydroxyl ions are formed at the cathode.

The chlorine formed at the anode may, depending on the pH, also be present as hypochlorous acid (HClO) or as a hypochlorite ($ClO^-$). Dissolved chlorine, hypochlorous acid and hypochlorite are called "free chlorine" or "free active chlorine" or "active chlorine". When using (common) tap water having a pH of about 7 to 8 and containing a small concentration of NaCl, sodium hypochlorite will be formed. The quantity of free chlorine to be formed will depend on the wanted concentration and the quantity of water to be treated.

Common equipment for disinfecting water consists of an electrolytic cell, a rectifier to convert mains voltage into direct current and a control to adapt the electric current to be supplied to the electrodes to the water flow rate.

Dutch patent application 1012794 describes an electrolytic device for a water supply system comprising an electrolytic cell provided with electrodes over which a voltage is applied, wherein the voltage difference for the electrolytic cell is at least partially supplied by a generator such as a turbine, for instance a DC turbine, driven by the water in the water supply system. The electrolytic cell and the generator of the electrolytic device according to NL 1012794 can be accommodated in one housing.

In the device according to NL 1012794 the electrolytic cell is placed directly in the fluid flow. A possible drawback of this embodiment is that in general too little chloride will be present in drinking water to actually form hypochlorite. According to the description, however, active compounds ensuring disinfection can be formed also in case chlorine is absent. Said compounds particularly are various free oxygen radicals. In practice it has appeared that for the formation of oxygen radicals not all electrode materials are suitable, but that a very special and expensive type of electrode is required to suppress the formation of oxygen. Another drawback occurring when insufficient chloride is present is that the action of the device can only be shown by actually performing tests on water containing bacteria and checking the killing factor.

BRIEF SUMMARY OF THE INVENTION

According to the present invention the above-mentioned drawbacks are overcome by guiding only a part of the water flow through an electrolytic cell and guiding at least a part of the feeding of the electrolytic cell through a salt dosing device containing a compound capable of supplying chloride ions.

The present invention provides an electrolytic device for disinfecting water in a water supply system by means of the generation of active chlorine, comprising an electrolytic cell provided with electrodes over which a voltage difference is applied, a generator for supplying the voltage difference for the electrolytic cell, which generator is driven by the water in the water supply system, characterized in that the device further comprises a supply pipe for the electrolytic cell that is connected to the water supply system and which guides a part of the water flow in the water supply system to the electrolytic cell, a discharge pipe for the electrolytic cell that is connected to the water supply system downstream of the location where the supply pipe for the electrolytic cell is connected to the water supply system and which discharges the water treated in the electrolytic cell to the water supply system, a salt dosing device containing a compound capable of supplying chloride ions, and which is connected to the supply pipe for the electrolytic cell such that at least a part of the water in the supply pipe for the electrolytic cell is guided through the salt dosing device for supplying chloride ions to the water that is treated in the electrolytic cell.

The present invention further relates to a method for disinfecting water in a water supply system by means of the generation of active chlorine using an electrolytic device comprising an electrolytic cell provided with electrodes over which a voltage difference is applied, a generator for supplying the voltage difference for the electrolytic cell, which generator is driven by the water in the water supply system, wherein a part of the water in the water supply system is branched off to form a feeding for the electrolytic cell, at least a part of the feeding for the electrolytic cell is guided through a salt dosing device containing a compound capable of supplying chloride ions, and subsequently is combined with the other part of the feeding for the electrolytic cell, the feeding containing chloride ions for the electrolytic cell being electrolysed in the electrolytic cell and subsequently being guided back to the water supply system.

BRIEF DESCRIPTION OF THE DRAWINGS FIGURES

Figure 2:
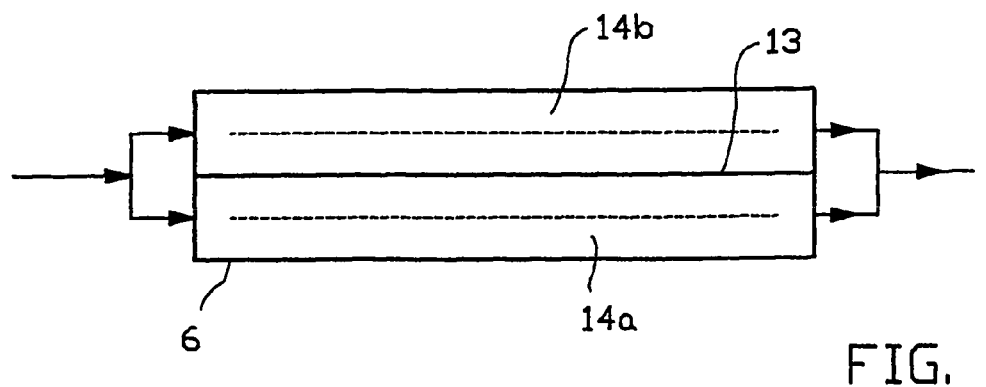

FIG. 1 illustrates the electrolytic device according to a preferred embodiment of the present invention FIG. 2 illustrates an embodiment of the electrolytic cell where the electrolytic cell is realized as a so-called membrane electrolytic cell.

DETAILED DESCRIPTION OF THE PREFERRED EMBODIMENTS

By guiding only a part of the water in the water supply system through an electrolytic cell and guiding at least a part of the feeding for the electrolytic cell through a salt dosing device, the chloride concentration is sufficiently high for the formation of active chlorine in the cell and the device according to the invention supplies sufficient active chlorine for the disinfection of water in the water supply system, while the salt content of the water in the main flow hardly increases.

In the present invention the disinfection is based on active chlorine. The concentration of active chlorine can be determined in a simple manner and using standard equipment. Measuring the concentration of active chlorine is a common and accepted method to establish whether disinfection takes place to a sufficient degree. In case of other active species more complicated methods are necessary for establishing the degree of disinfection such as measuring the number of colonies of legionnella bacteria or other bacteria.

In the device according to the invention preferably compounds are used that are capable of supplying chloride ions to water so that upon oxidation active chlorine is formed. The person skilled in the art will see that the present invention can also be used for compounds which discharge substances to water that are capable of being oxidised through electrolysis into other active oxidants than chlorine.

It is known that certain harmful organisms are present in water pipes which organisms are shielded by a so-called biofilm. Often high doses of chlorine are required to remove said organisms. It is recommended to first thoroughly disinfect the water pipe, after which the growth of biofilm can be prevented by using the present device.

According to a preferred embodiment of the invention the device further comprises a supply pipe for the salt dosing device which is connected to the supply pipe for the electrolytic cell and which supplies a part of the water in the supply pipe for the electrolytic cell to the salt dosing device, and a discharge pipe for the salt dosing device which is connected to the supply pipe for the electrolytic cell downstream of the location where the supply pipe for the salt dosing device is connected and which guides the water containing chloride ions from the salt dosing device to the supply pipe for the electrolytic cell.

In general guiding only a small part of the feeding of the electrolytic cell through the salt dosing device will suffice.

The quantities of water going directly to the electrolytic cell and which can be guided through the salt dosing device, can simply be adjusted by making constrictions (orifices) in the pipes. Regulating valves, for instance screw needle valves, may for instance also be used.

Preferably, the generator is accommodated in the water supply system downstream of the location where the supply pipe for the electrolytic cell is connected to the water supply system, and upstream of the location where the discharge pipe of the electrolytic cell is connected to the water supply system. Due to this positioning of the generator a slight pressure drop of some mwk will occur over the generator, as a result of which it will be possible to generate the water flow that will run through the electrolytic cell. Nonetheless it is possible to accommodate the generator elsewhere in the water supply system. However, measures will then have to be taken to ensure a sufficient flow through the electrolytic cell, for instance by providing a constriction or regulating valve in the main pipe.

The salt dosing device has to be designed such that siphonage, rebound and partial diffusion are prevented. This may for instance be achieved by placing simple non-return valves in the supply and discharge.

An example of a usable salt dosing device is the housing of a candle filter. Here the water is supplied to a vessel from above and is discharged via the upper side again through an internal pipe from the bottom side. At the bottom of the vessel there are lumps of salt, so that the solution is over-saturated. Due to the high specific gravity of the salt water it will remain at the bottom of the vessel, so near the entrance of the discharge. The entering water will ensure the discharge of salt by displacement.

An advantage of the device according to the invention with respect to the known device is that there is always sufficient conductivity in the water flow through the electrolytic cell, as a result of which a much smaller electrode surface area suffices. Due to the high conductivity it is possible to place a membrane between the electrodes without much additional energy being required. When using a membrane a much more effective anode process will take place because the pH remains low due to the shielding of the cathode reactions. The flow past the cathode can immediately be remixed with the anode flow. Alternatively the cathode flow may entirely or partially be added further down in the main pipe, that means after adding the anode flow. It is known that disinfecting using active chlorine works best in the pH range of below 6.

In the description, water supply system refers to each pipe through which water is guided or in which water is present. Said pipe may for instance be a hot water pipe in a residence, but also a supply pipe for fresh or recycled water in a swimming pool.

In case the generator is of the type which supplies an electric current which is proportional to the quantity of water flowing past it, the generator, when the speed of flow increases and more water has to be disinfected, will supply more power so that more active chlorine is formed.

A suitable type of generator is a DC generator.

By once adjusting the wanted voltage power with a variable resistance in the electric supply lead to the electrodes, the device can be adjusted to the conductance of the water. As the variations of the water composition in water supply systems are usually of a minor nature, it will in general not be necessary to adapt the adjustment for a long time.

The device of the invention therefore provides in its own need for power and is self adjusting.

When the water contains calcium and/or magnesium said elements may deposit on the electrodes in the form of their salts. A known method to prevent such a fouling of the electrodes, is to regularly reverse the polarity of the electrodes. In case of separate processing of the anode and cathode flows when using a membrane electrolytic cell reversing the polarity is not possible. In that case softening by means of an ion exchanger resin can be used. The feeding of the electrolytic cell can be softened using an ion exchanger resin. Because only a small part of the water flow is guided through the electrolytic cell only a small quantity of softener resin is necessary.

A very simple apparatus that can be built in against low costs, is obtained when the electrolytic cell and the generator, or at least its driving part, are accommodated in one housing.

In the attached FIG. 1 an electrolytic device according to a preferred embodiment of the present invention is schematically shown. In FIG. 1, 1 refers to a generator 1 consisting of a DC dynamo 3 and a blade wheel 2 placed in the main pipe 4. A supply pipe for the electrolytic cell 5 is branched off from the main pipe upstream of the generator 1 and guides a part of the water to the electrolytic cell 6. A discharge pipe for the electrolytic cell 7 guides the water treated in the electrolytic cell back to the main pipe 4. A supply pipe for the salt dosing device 8 branches off a part of the flow through the supply pipe for the electrolytic cell 5 and guides it to the salt dosing device 9 wherein a saturated sodium chloride solution and solid sodium chloride are present, and wherein salt is take up in the water. Discharge pipe for the salt dosing device 10 guides the salt containing water back to the supply pipe for the electrolytic cell 5. In FIGS. 1, 11 and 12 refer to non-return valves and constrictions, respectively.

FIG. 2 illustrates an embodiment of the electrolytic cell wherein the electrolytic cell is realised as a so-called membrane electrolytic cell. Here a cation selective membrane 13, preferably a fluorine halogen type membrane such as NAVION which is active chlorine resistant, is placed between cathode 14*a* and the anode 14*b* of the electrolytic cell 6 to shield the anode reactions from the cathode reactions.

When a membrane electrolytic cell is used, the cathode flow can even be discharged separately and be mixed with the main flow. In that case softening has to take place using ion exchanger resin.

When the generator does not function sufficiently, or when no or insufficient salt is supplied to the water the current to the electrodes will strongly drop. This can be detected via a diode circuit which for instance is able to actuate an alarm light on the system.

At a flow rate of 1000 l/h of drinking water, the generator will produce a current of approximately 0.2-0.4 ampere, which is enough to eventually obtain a content of 0.2 to 0.4 mg/l of active chlorine in the water. The device is designed such that 10 l/h of water is guided through the electrolytic cell and approximately 100 ml/h of water is guided through the salt dosing device. The salt dosing device contains water fully saturated with salt and thus contains approximately 300 g/l of salt. The 100 ml/h of water running through the salt vessel, will take up salt in a quantity of up to 300 g/l. This salt containing water is mixed with the rest of the 10 l/h which is guided through the electrolytic cell so that the feeding for the electrolytic cell will eventually contain approximately 3 g/l of salt. This results in a conductivity of approximately 6 mS/cm which is sufficient for a well running electrolysis process. With this conductivity a current density of approximately 2 A/dm$^2$ can be achieved at a voltage of approximately 5 volt. The necessary electrode surface then is approximately 0.2 dm$^2$ for a current of 0.4 A. The salt content of the main flow will as a result eventually only increase with approximately 30 mg/l. The required energy production by the generator has to be approximately 2 W. Starting from an efficiency of 33% of the generator, 6 W of energy will be abstracted from the water. This corresponds to a pressure drop of 2.2 mwk. In an average household approximately 100 l/day of hot water is used. When the salt content increases with 30 mg/l the use of salt will therefore be 3 g/day, or approximately 1 kg per year. Replacing the salt in a vessel of 1.5 liter once annually then is more than sufficient.

The invention claimed is:

1. An electrolytic device for disinfecting water in a water supply system by generation of active chlorine, consisting essentially of:
    an electrolytic cell provided with electrodes over which a voltage difference is applied,
    a generator for supplying the voltage difference for the electrolytic cell, which generator is driven by the water in the water supply system,
    a supply pipe for the electrolytic cell that is connected to the water supply system and which guides a part of the water flow in the water supply system to the electrolytic cell
    a discharge pipe for the electrolytic cell that is connected to the water supply system downstream of the location where the supply pipe for the electrolytic cell is connected to the water supply system and which discharges the water treated in the electrolytic cell to the water supply system,
    a salt dosing device containing a compound capable of supplying chloride ions,
    a supply pipe for the salt dosing device which is connected to the supply pipe for the electrolytic cell and which supplies at least a part of the water in the supply pipe for the electrolytic cell to the salt dosing device for supplying chloride ions to the water to be treated in the electrolytic cell,
    a discharge pipe for the salt dosing device which is connected to the supply pipe for the electrolytic cell downstream of the location where the supply pipe for the salt dosing device is connected and which guides the water containing chloride-ions from the salt dosing device to the supply pipe for the electrolytic cell, and
    means for regulating the ratios of the water flow in the water supply system, the feeding for the electrolytic cell and the feeding for the salt dosing device comprising:
    constrictions and/or regulating valves accommodated in the water supply system between the location where the supply pipe for the electrolytic cell is connected to the water supply system and the location where the discharge pipe for the electrolytic cell is connected to the water supply system, the supply pipe for the electrolytic cell, the discharge pipe for the electrolytic cell, the supply pipe for the salt dosing device and/or the discharge pipe for the salt dosing device, and
    a blade wheel connected with the generator for driving the generator and accommodated in the water supply system downstream of the location where the supply pipe for the electrolytic cell is connected to the water supply system and upstream of the location where the discharge pipe of the electrolytic cell is connected to the water supply system.

2. An electrolytic device according to claim 1, the electrolytic cell being a membrane electrolytic cell.

3. An electrolytic device according to claim 1, the generator being a DC generator.

4. An electrolytic device according to claim 1, the generator comprising a DC dynamo.

5. An electrolytic device according to claim 1, wherein at a flow rate of 1000 l/h of drinking water, the generator will produce a current of approximately 0.2-0.4 A.

6. An electrolytic device according to claim 1, wherein an electrode surface is approximately 0.2 dm$^2$ for a current of 0.4 A.

7. A method for disinfecting water in a water supply system, consisting essentially of:
    generating active chlorine using an electrolytic device comprising an electrolytic cell provided with electrodes over which a voltage difference is applied, a generator for supplying the voltage difference for the electrolytic cell, which generator is driven by the water in the water supply system, wherein a part of the water in the water supply system is branched off to form a feeding for the electrolytic cell, at least a part of the feeding for the electrolytic cell is guided through a salt dosing device containing a compound capable of supplying chloride ions, and subsequently is combined with the other part of the feeding for the electrolytic cell, the feeding containing chloride-ions for the electrolytic cell being electrolysed in the electrolytic cell and subsequently being guided back to the water supply system, wherein the ratios of the flow in the water supply system, the feeding for the electrolytic cell and the feeding for the salt dosing device are regulated by means comprising constrictions and/or regulating valves and by the pressure drop over a blade wheel accommodated in the water supply system downstream of the location where the supply pipe for the electrolytic cell is connected to the water supply system and upstream of the location where the discharge pipe of the electrolytic cell is connected to the water supply system and connected with the generator for driving the generator.

8. A method according to claim 7, wherein at a flow rate of 1000 l/h of drinking water, the generator will produce a current of approximately 0.2-0.4 A.

9. A method according to claim 7, wherein an electrode surface is approximately 0.2 dm$^2$ for a current of 0.4 A.

10. An electrolytic device for disinfecting water in a water supply system by generation of active chlorine, consisting essentially of:
- an electrolytic cell provided with electrodes over which a voltage difference is applied,
- a generator for supplying the voltage difference for the electrolytic cell, which generator is driven by the water in the water supply system,
- a supply pipe for the electrolytic cell that is connected to the water supply system and which guides a part of the water flow in the water supply system to the electrolytic cell
- a discharge pipe for the electrolytic cell that is connected to the water supply system downstream of the location where the supply pipe for the electrolytic cell is connected to the water supply system and which discharges the water treated in the electrolytic cell to the water supply system,
- a salt dosing device containing a compound capable of supplying chloride ions,
- a supply pipe for the salt dosing device which is connected to the supply pipe for the electrolytic cell and which supplies at least a part of the water in the supply pipe for the electrolytic cell to the salt dosing device for supplying chloride ions to the water to be treated in the electrolytic cell,
- a discharge pipe for the salt dosing device which is connected to the supply pipe for the electrolytic cell downstream of the location where the supply pipe for the salt dosing device is connected and which guides the water containing chloride-ions from the salt dosing device to the supply pipe for the electrolytic cell, and
- a device configured for regulating the ratios of the water flow in the water supply system, the feeding for the electrolytic cell and the feeding for the salt dosing device comprising:
- constrictions and/or regulating valves accommodated in the water supply system between the location where the supply pipe for the electrolytic cell is connected to the water supply system and the location where the discharge pipe for the electrolytic cell is connected to the water supply system, the supply pipe for the electrolytic cell, the discharge pipe for the electrolytic cell, the supply pipe for the salt dosing device and/or the discharge pipe for the salt dosing device, and
- a blade wheel connected with the generator for driving the generator and accommodated in the water supply system downstream of the location where the supply pipe for the electrolytic cell is connected to the water supply system and upstream of the location where the discharge pipe of the electrolytic cell is connected to the water supply system.

11. An electrolytic device according to claim 10, the electrolytic cell being a membrane electrolytic cell.

12. An electrolytic device according to claim 10, wherein the generator is a DC generator.

13. An electrolytic device according to claim 10, wherein the generator is a DC dynamo.

14. An electrolytic device according to claim 10, wherein at a flow rate of 1000 l/h of drinking water, the generator will produce a current of approximately 0.2-0.4 A.

15. An electrolytic device according to claim 10, wherein an electrode surface is approximately 0.2 dm$^2$ for a current of 0.4 A.

* * * * *